Oct. 8, 1968 R. C. BRAINARD ETAL 3,405,311

TELEVISION SCANNING CONTROL APPARATUS TO COMPENSATE FOR VARIATIONS IN THE VERTICAL SCANNING RATE BY VARYING THE BLANKING INTERVAL

Filed Aug. 3, 1966 2 Sheets-Sheet 1

INVENTORS R. C. BRAINARD
E. F. BROWN
BY John V. Mullarney
ATTORNEY 3,405,311

TELEVISION SCANNING CONTROL APPARATUS TO COMPENSATE FOR VARIATIONS IN THE VERTICAL SCANNING RATE BY VARYING THE BLANKING INTERVAL

Ralph C. Brainard, Tewkesbury Township, Hunterdon County, and Earl F. Brown, Piscataway Township, Middlesex County, N.J., assignors to Bell Telephone Laboratories, Incorporated, Berkeley Heights, N.J., a corporation of New York Filed Aug. 3, 1966, Ser. No. 569,964
9 Claims. (Cl. 315—19)

ABSTRACT OF THE DISCLOSURE

In a system where horizontal and vertical scanning signals run independently and the vertical scanning rate is dependent upon the line voltage frequency, apparatus is provided to maintain the number of horizontal lines in each frame constant. A photosensitive device detects horizontally scanned lines at a particular location on the screen and sets a multivibrator which generates a blanking pulse to block any further horizontally scanned lines until a vertical scanning retrace signal is developed.

This invention relates to television scanning techniques and, more particularly, to apparatus which compensates for frequency variations in the vertical scanning signal.

In closed circuit television systems scanning techniques may differ significantly from those of conventional broadcast television systems. One particular closed circuit television system, developed by the Bell System to provide two-way visual communication as an accompaniment to telephone service, generates interlaced video signals without maintaining a precise frequency ratio between the horizontal and vertical scanning signals. In this particular system the horizontal and vertical scanning signals start simultaneously at the beginning of each field and then run independently of each other for the balance of the field. The repetition rate of the vertical scanning signal, comprising a sweep signal and a flyback signal, is derived from a commercial power line signal. The repetition rate of the horizontal scanning signal is derived from a free-running oscillatory signal. The zero crossing point of the commercial power line signal at the beginning of each cycle coincides with the start of the vertical blanking signal of the transmitted television signal and hence the start of the vertical flyback signal. At the termination of the vertical blanking signal, which has a fixed time period exceeding the time necessary for the vertical flyback signal, the sweep signal portion of the vertical scanning signal begins and continues until the next zero crossing at the start of a subsequent cycle of the commercial power line signal. The duration of the sweep signal portion of the vertical scanning signal, and hence the picture signal duration of the television signal, varies in accordance with frequency variations of the commercial power line signal. Since the horizontal scanning signals run independently of the vertical scanning signal, the number of horizontal lines scanned in each field varies in accordance with variations in the duration of the vertical sweep signal.

A semirandom technique is often used to interlace the fields of each frame of the television signal. This technique permits the number of lines in each field to vary without affecting the interlace. A discussion of a semirandom interlace technique is found, for instance, in the Meacham Patent 3,099,712, issued July 30, 1963.

In the above-described television system the duration of the picture signal and hence the number of lines in each field of the television signal, may change slightly due to variations in the duration of the vertical sweep signal.

Now an annoying flicker pattern occurs at the bottom of a scanned picture as scan lines are added to or subtracted from each field. This flicker pattern may be concealed by masking the bottom of the scanned picture area; however, it has been found that a flashing effect is still evident to the viewer as lines are added or subtracted.

In addition, because of the low-frequency variations in the vertical scanning signal, it is usually necessary to direct-current couple the vertical scanning signal to the vertical deflection coil of the picture tube to prevent jitter or motion oft he raster. The direct-current coupling permits the low-frequency variations in the vertical scanning signal to be transmitted to the vertical deflection coil without distortion. The power requirements of the scanning signal wtih a direct-current coupling are, however, greater than the power requirements of the alternating-current coupling.

It is, theefore, an object of the present invention to display a television signal having a constant number of lines in each field irrespective of frequency variations in the commercial power line signal controlling the vertical scanning signal.

It is another object of the invention to utilize a lower powered vertical scanning signal than has heretofore been necessary to scan each field of the television signal.

It is yet another object of the invention to apply a vertical scanning signal to the vertical deflection coil, via an alternating current coupling, with negligible distortion.

It is still another object of the invention to eliminate flicker patterns at the bottom of the scanned picture area of displayed picture signals.

Therefore, in accordance with the present invention, apparatus is provided to accurately control the number of lines in each displayed field of a semirandom interlaced television signal, irrespective of frequency variations in the vertical scanning signal, by varying the duration of the vertical blanking signal. A photosensitive device is utilized to detect a horizontally scanned line at a particular location at the bottom of the scanned picture area on the picture tube of the receiver. Upon detection of the horizontally scanned line at this particular location, the photosensitive device gates a signal which sets a bistable multivibrator. The output signal of the multivibrator is utilized to blank out the picture signal in the receiver. The multivibrator output signal is additionally utilized to supply a low-frequency correction signal to the vertical-deflection coil of the picture tube, which is alternating-current coupled to the vertical sweep generator. The low-frequency correction signal compensates for the low-frequency variations in the vertical scanning signal which are not transmitted by the alternating-current coupling. The trailing edge of the conventional vertical blanking signal generated by the transmitter is utilized to reset the bistable multivibrator and thereby terminate the signal which is blanking out the picture signal.

The duration of the displayed picture signal is in accordance with the invention constrained to be a constant by limiting the number of lines in each field of the displayed picture signal. The scanning control apparatus, via the photosensitive device, in effect counts the number of lines scanned in each field by relating the number of lines scanned to the vertical extent of the scanned picture signal displayed on the picture tube.

The alternating current coupling of the vertical scanning signal to the vertical deflection coil of the picture tube permits impedance matching and hence greatly improves the power transfer efficiency of the coupling of the vertical scanning signal to the vertical deflection coil.

This simple and inexpensive apparatus is highly advantageous to such fields of application as closed circuit television systems and telephone systems with visual accompaniment where low cost and good picture quality are prime objectives.

These and other objects and features, the nature of the present invention, and its various advantages will be more readily understood upon consideration of the attached drawings and the following detailed description thereof.

Figure 1:
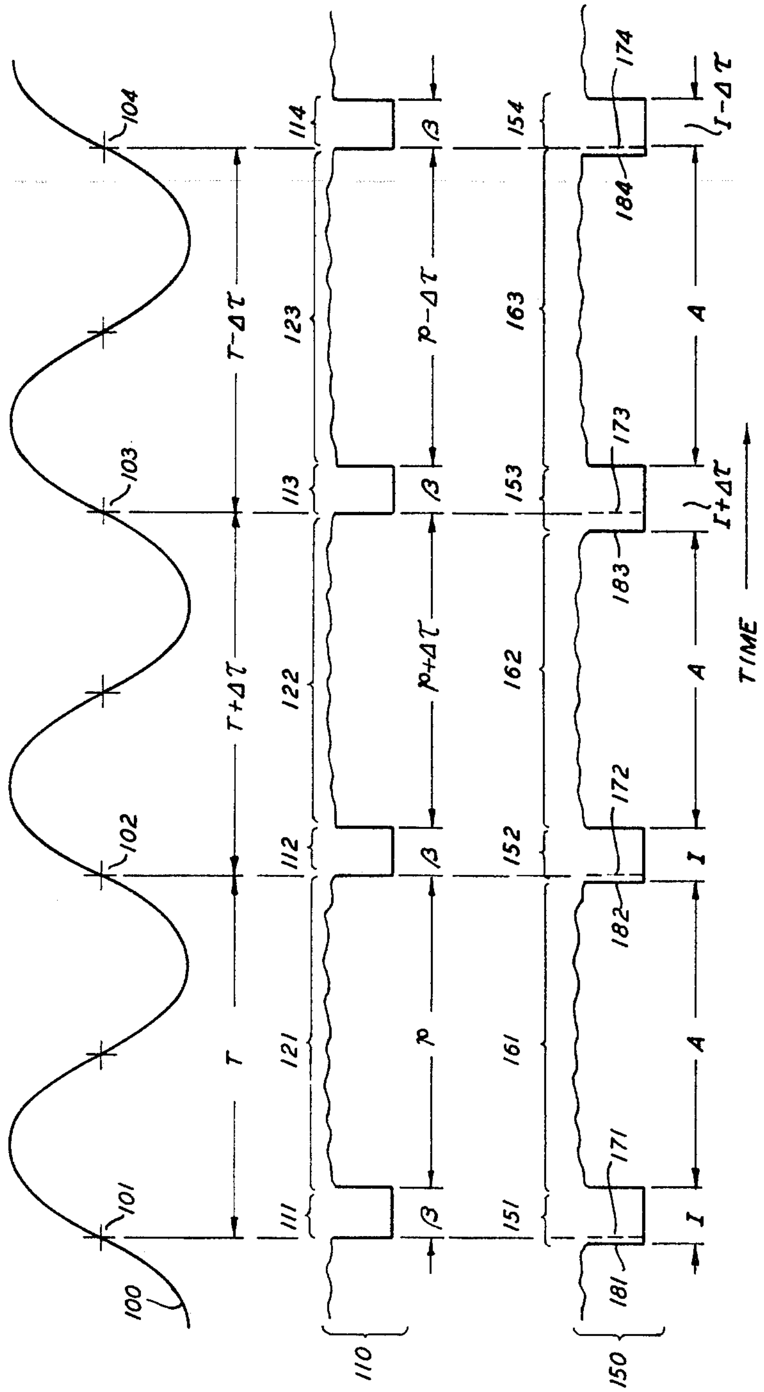
FIG. 1 is an illustrative graphical representation of waveforms of both the transmitted composite television signal and of the composite television signal as displayed by the picture tube at the receiver in accordance with the invention.

Referring now to FIG. 1, a commercial power line signal 100, used to control the repetition rate of the vertical scanning signal, is shown together with the composite television signals 110 and 150. These two composite signals 110 and 150, respectively, represent the composite television signal as transmitted to the television receiver and the composite television signal as modified for display purposes in accordance with applicants' invention. In order to simplify the waveforms the horizontal blanking signals of the two composite signals 110 and 150 are not shown, however, their presence will be readily apparent to those skilled in the art. The zero crossover points 101, 102, 103, and 104, represent the beginning of successive cycles of the commercial power line signal 100.

The successive cycles of the commercial power line signal 100 vary slightly in duration (i.e. frequency). The first cycle, starting at crossover point 101, is of standard frequency having a period T. The subsequent cycle, starting at crossover point 102, may have decreased slightly in frequency, and may have a longer period of T plus $\Delta T$. The next succeeding cycle, starting at crossover point 103, has increased in frequency and hence has a shorter period of T minus $\Delta T$. It is to be understood that the aforementioned frequency deviations are for illustrative purposes only and are not intended to exhaust the nature of commercial power line signal frequency deviations to which applicants' invention applies.

The composite television signal 110, representing the transmitted television signal, includes a series of vertical blanking signals 111, 112, 113, and 114, each of which respectively begins simultaneously with the zero crossings 101, 102, 103, and 104 of the commercial power line signal 100. Each of these vertical blanking signals, 111, 112, 113, and 114, has a duration equaling some fixed time period. The duration of the picture signals 121, 122, and 123 differ from one another. These time duration differences correspond to the frequency variations in the successive cycles of the controlling commercial power line signal 100. The duration P plus $\Delta T$ of the picture signal 122 corresponds to the longer period of the cycle of the commercial power line signal 100 beginning at crossover point 102 and hence exceeds the duration T of the picture signal 121. The duration P minus $\Delta T$ of the picture signal 123 corresponds to the shortened period of the cycle of the commercial power line signal 100 beginning at crossover point 103. From the foregoing, it is apparent that as the frequency of the commercial power line signal 100 varies, the durations of the picture signals 121, 122, and 123 correspondingly vary.

The composite television signal 150 is a modified version of the composite television signal 110, as displayed by the picture tube in accordance with the present invention. The picture signals 161, 162, and 163 represent the major portions of the picture signals 121, 122, and 123 with the terminal part of each signal blanked to achieve uniform duration of the picture signals. The picture signals 161, 162, and 163 are all of equal duration A. The vertical blanking signals 151, 152, 153, and 154 have varying time intervals corresponding to the frequency variations of the commercial power line signal 100. For instance, the time duration I plus $\Delta T$ of the vertical blanking signal 153 is greater in duration that the time duration I of the vertical blanking signal 152. The added duration $\Delta T$ in the vertical blanking signal 153 corresponds to the added duration $\Delta T$ in the picture signal 122. The timing of the leading edges 181, 182, 183, and 184 of each of the vertical blanking signals 151, 152, 153, and 154 is determined by the detection of a scanned line at a particular location on the display area of the picture tube of the television receiver.

The dotted time marks 171, 172, 173, and 174 correspond to the times at which the vertical flyback signals, occurring during each vertical blanking signal, begin. These time marks occur simultaneously with the zero crossover points 101, 102, 103, and 104 of the commercial power line signal 100. In the modified scanning apparatus of the present invention, the time at which the vertical flyback signal begins is independent of the time at which the vertical blanking signal of the displayed picture signal begins. By varying the duration of the vertical blanking signal to compensate for the frequency variations in the commercial power line signal 100, each of the picture signal durations of the composite television signal 150 is equal to some constant value A and hence the number of scanned lines in each field of the displayed television signal is a constant.

Figure 2:
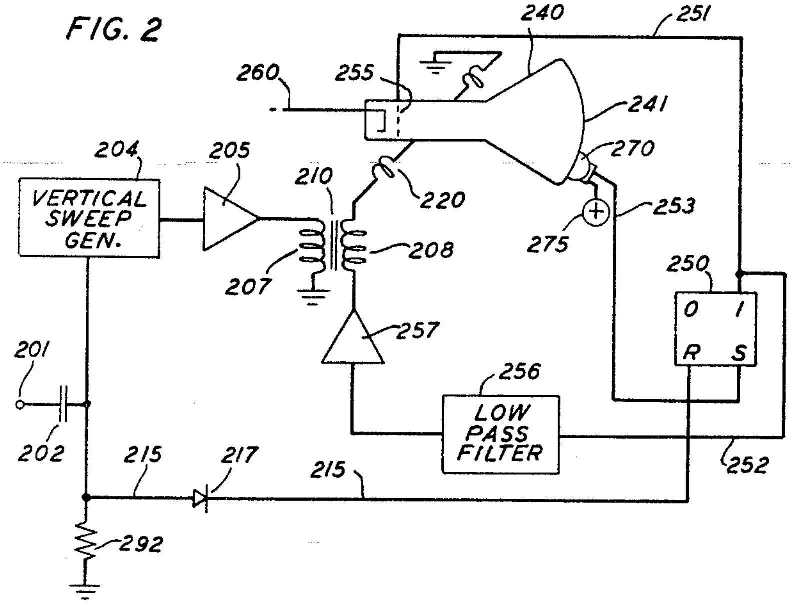
FIG. 2 is a schematic block diagram of the auxiliary vertical scanning control circuitry of a television receiver constructed in accordance with the invention.

Referring now to FIG. 2, a schematic block diagram is shown of an illustrative embodiment of the invention. The vertical blanking signal is separated from the picture signal of a transmitted composite television signal, such as signal 110 in FIG. 1, by a sync separation circuit (not shown). Such circuitry is well known in the art. For illustrative purposes this transmitted composite television signal is assumed to have a 2:1 interlace with a 30 cycle frame repetition rate. The picture signal is applied, via lead 260, to the electron gun of the cathode ray tube 240 of the television receiver. The separated vertical blanking signal is applied, via lead 201, to the capacitor 202. The capacitor 202 and resistor 292 differentiates the leading edge and the trailing edge of the vertical blanking signal to form two sequentially occurring short duration pulse signals of opposite polarity. The two pulse signals are applied, via lead 203, to a vertical sweep generator 204.

The pulse signal corresponding to the leading edge of the vertical blanking signal resets the vertical sweep generator 204, thereby terminating the vertical sweep signal and initiating the vertical flyback signal. The pulse signal corresponding to the trailing edge of the vertical blanking signal initiates the next succeeding vertical sweep signal. The vertical sweep generator 204 may comprise any known circuit capable of generating linear sweep and flyback voltage waveforms, respectively responisve to pulse signals of opposite polarity. Suitable sweep generators for this purpose are well known to those skilled in the art and need not be discussed in detail.

The vertical sweep and flyback signals generated by the vertical sweep generator 204 are applied to a power amplifier 205. The amplifier 205 amplifies these signals and applies them to the primary winding 207 of the coupling transformer 210. The transformer 210 couples the sweep signal to its secondary winding 208 and from thence to the vertical deflection coil 220 of the cathode ray tube 240. The transformer 210 is preferably designed to match the load impedance of the vertical deflection coil 220 and the output impedance of the amplifier 205 to achieve high efficiency in the power transfer of the vertical sweep signal.

The power of the vertical sweep signal occurs mostly in the frequency region above the 60-cycle field repetition rate. However, because the sweep signal tends to vary slightly in frequency, due to variations in the commercial power line signal, it has low frequency components below 60 cycles. The transformer 210 is unable to transmit these low frequency components of the sweep signal and hence the vertical sweep signal is somewhat distorted. These distortions are compensated for in accordance with the invention.

A photosensitive device 270 is attached to the face plate 241 of the cathode ray tube 240. This photosensitive device is located to detect a scanned horizontal line occurring near the end of each scanned picture signal. The photosensitive device 270 may comprise a phototransistor which, in response to a light signal enables a conduction path from its emitter to its collector. The sensitivity of the photosensitive device is selected to permit the intensity of light displayed in dark background areas of the picture to activate it. When a scanned line is detected by the photosensitive device 270 a conduction path is enabled to transmit a voltage signal supplied by the voltage source 275 to the set input of a bistable multivibrator 250.

The bistable multivibrator 250 is in its reset state during most of the time period when the transmitted picture signal is being applied to the cathode ray tube 240. This reset condition results from the application of the pulse signal, corresponding to the trailing edge of the transmitted vertical blanking signal, to the reset input of the multivibrator 250. This pulse signal is applied to the reset input via the diode 217 and lead 215. The diode 217 blocks the pulse signals corresponding to the leading edge of the transmitted vertical blanking signal from being applied to the reset input.

With the multivibrator 250 in the reset state, no blanking signal output is present on its output lead 251. Upon the receipt of a signal, via lead 253, in response to the detection of a scanned line by the photosensitive device 270, the multivibrator 250 is switched into its set state. The multivibrator 250 in its set state applies a blanking signal, on its output lead 251, to the blanking grid 255 of the cathode ray tube 240. This blanking signal blanks out the balance of the picture signal applied to the cathode ray tube, even though the transmitted vertical blanking signal has not yet been received.

The vertical flyback signal is triggered subsequent to the actual blanking of the picture signal by a pulse signal on lead 203 corresponding to the leading edge of the transmitted vertical blanking signal. The photosensitive device is located on the face plate 241 to trigger the blanking signal, generated by the bistable multivibrator 250, in advance of the leading edge of the transmitted vertical blanking signal (see also FIG. 1). By blanking the displayed picture signal in accordance with the vertical extent of the scanned picture, the number of lines in the displayed picture signal is constrained to be a constant.

As hereinabove described, the low-frequency variations of the vertical sweep generator are not transmitted by the transformer 210 to the vertical deflection coil 220. Due to the loss of these low-frequency components, the vertical sweep signal is distorted. These distortions are compensated for herein by inserting a correction signal into the vertical deflection coil. The correction signal may be generated by time modulating a pulse signal in accordance with changes in the duration of the transmitted picture signal and utilizing its low-frequency signal components as the correction signal. A suitable time modulated pulse signal is (the blanking signal) generated by the bistable multivibrator 250. Each vertical blanking signal of the bistable multivibrator 250 is applied, via lead 252, to a low-pass filter 256 which removes its high-frequency components. The filter 256 preferably has its cutoff region between 30 and 60 cycles. The low-frequency signals transmitted by the filter are amplified by a power amplifier 257 and applied to the secondary winding 208 of the transformer 210 and from thence to the vertical deflection coil 220. The low-frequency components of this blanking signal thus compensate for the distortions of the vertical sweep signal caused by the loss of low-frequency components blocked by the high-pass filter characteristics of the transformer 210.

Figure 3A:
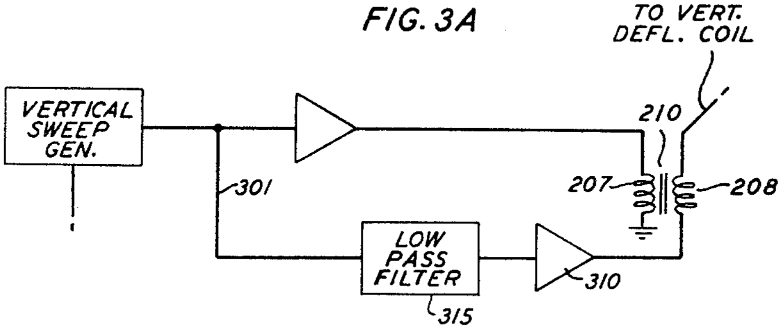
FIGS. 3A and 3B are schematic block diagrams of two alternate schemes in accordance with the invention to compensate for distortions in the vertical scanning signal.
Figure 3B:
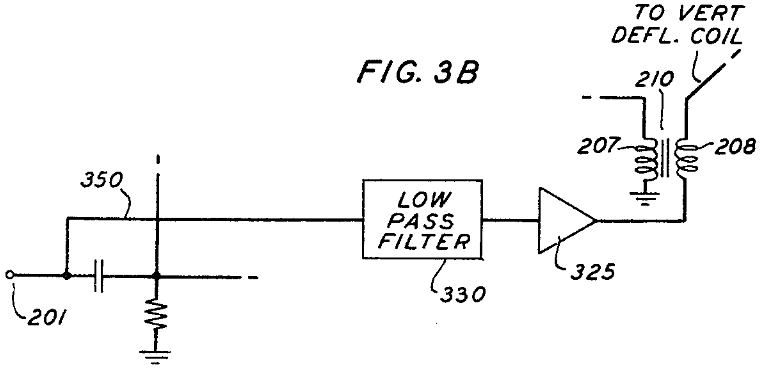

Referring to FIGS. 3A and 3B, two alternate schemes are shown to produce correction signals to compensate for the sweep signal distortions in the vertical deflection coil 220, due to the loss of low-frequency variations in transmitting the sweep signal, via the coupling transformer 210. These schemes replace the lead 252, filter 256, and amplifier 257 shown in FIG. 2. In the first alternate scheme of FIG. 3A, the output signal of the vertical sweep generator 204 is directly applied, via lead 301, through a low-pass filter 315 and a power amplifier 310 to the secondary coil 208. In the second scheme the transmitted vertical blanking signals are directly applied, via lead 350, through a low-pass filter 330 and an amplifier 325 to the secondary coil 208. The low-frequency signal variations, due to the different spacings between the transmitted vertical blanking signals, as the picture signal duration changes, supply the correction signals.

As is apparent from the foregoing, the incoming vertical blanking signal which has a constant time duration, is separated from the picture signal. This vertical blanking signal is utilized to control the timing of the vertical sweep generator. However, the blanking signal actually utilized to blank out the picture signal is independent of the transmitted vertical blanking signal and hence has a variable duration to compensate for variations in frequency of the vertical scanning signal. The number of horizontal lines scanned in each field is a constant and hence no annoying flicker pattern at the bottom of the picture is present.

While the above embodiment has been discussed solely in terms of compensating for variations in the vertical scanning rate, the invention also compensates for variations in the horizontal scanning rate by accepting the horizontal scanning rate as a reference and transposing its variations to the vertical scanning rate. This is readily apparent to those skilled in the art and need not be discussed in detail.

It is to be understood that the above-described arrangements are merely illustrative of the numerous and varied other arrangements which may constitute applications of the principles of the invention. Such other arrangements may readily be devised by those skilled in the art without departing from the spirit and scope of this invention.

What is claimed is:

1. In combination, a cathode ray tube having a blanking grid and a vertical deflection coil, a vertical sweep generator subject to low-frequency variations, means coupling said vertical sweep generator to said vertical deflection coil, the signal pass band of said coupling means being above the frequency range of said low-frequency variations, means to produce signals to substantially correct for the low-frequency variations of the signal output of said vertical sweep generator obstructed by said coupling means, means to apply the correction signals to said vertical deflection coil, means to limit the vertical extent of the scanned picture displayed by said cathode ray tube, said limiting means including detection means responsive to the scanning of a particularly located horizontal line, means responsive to said detection means to generate a blanking signal, means to apply said blanking signal to said blanking grid, and means to terminate said blanking signal simultaneously with the start of a subsequent scanned picture.

2. The combination in claim 1 wherein the means to generate said correction signals comprises means to eliminate the high-frequency components of the blanking signal and means to direct-current couple the low-frequency components of the blanking signal to said vertical deflection coil.

3. The combination in claim 1 wherein said means to generate said correction signals includes means to eliminate the high-frequency components of the signal output of said vertical sweep generator and means to direct-current couple the low-frequency components of said signal output to said vertical deflection coil.

4. The combination in claim 1 wherein said means to generate said correction signals includes means to eliminate the high-frequency components of a pulse signal corresponding to the received picture signal duration and means to direct-current couple the low-frequency components of said corresponding signal to said vertical deflection coil.

5. The combination in claim 1 wherein said detection means includes a photosensitive device positioned near the bottom of the scanned picture area on the picture display surface of said cathode ray tube.

6. In a television receiver system having a cathode ray tube, a vertical scan control apparatus for said tube including a blanking grid and vertical beam deflection means, and a vertical sweep generator driven by a source subject to low-frequency variations, the combination comprising picture signal control means for selectively blanking out the picture signal in said cathode ray tube by applying a cutoff voltage to said blanking grid, said picture signal control means including light sensitive means responsive to a horizontally scanned line at a particular location in the face plate of said cathode ray tube, means to utilize the output of said light sensitive means to generate a signal, bistable means responsive to said generated signal, means to utilize the output of said bistable means to apply a cutoff voltage to said blanking grid, alternating current coupling means to transmit the sweep signal of said vertical sweep generator to said vertical beam deflection means, means to utilize the output of said bistable means to apply low-frequency correction signals to said vertical beam deflection means to compensate for low-frequency variations eliminated by said alternating current coupling means, and means to utilize the trailing edge of the conventional blanking signal generated at the transmitting portion of the television system to terminate the cutoff voltage applied to said blanking grid.

7. A television receiver system as defined in claim 6 wherein said means to utilize the output of said bistable means to apply low-frequency correction signals to said vertical beam deflection means comprises means to eliminate the high-frequency components of said output of said bistable means and means to direct-current couple the low-frequency components of said output of said bistable means to said vertical beam deflection means.

8. A television receiver system as defined in claim 6 wherein said light sensitive means includes a photosensitive device positioned near the bottom of the scanned picture area on the face plate of said cathode ray tube.

9. In a television receiver system having a cathode ray tube, vertical scan control apparatus for said tube including a blanking grid and vertical beam deflection means, and a vertical sweep generator driven by a source subject to low-frequency variations, the combination comprising picture signal control means for selectively blanking out the picture signal in said cathode ray tube by applying a cutoff voltage to said blanking grid, said picture signal control means including light sensitive means responsive to a horizontally scanned line at a particular location in the face plate of said cathode ray tube, means to utilize the output of said light sensitive means to generate a signal, bistable means responsive to said generated signal, means to utilize the output of said bistable means to apply a cutoff voltage to said blanking grid, said light sensitive means including a photosensitive device positioned near the bottom of the scanned picture area on the face plate of said cathode ray tube, and means to utilize the trailing edge of the conventional blanking signal generated at the transmitting portion of the television system to terminate the cutoff voltage applied to said blanking grid.

References Cited

UNITED STATES PATENTS

| | | | |
|---|---|---|---|
| 2,556,455 | 6/1951 | Szegho et al. | 315—21 X |
| 2,750,533 | 6/1956 | Schwartz | 315—21 X |
| 2,989,583 | 6/1961 | Thompson | 315—21 X |
| 3,102,923 | 9/1963 | Clapp | 315—22 X |

RODNEY D. BENNETT, *Primary Examiner.*

B. L. RIBANDO, *Assistant Examiner.*